(12) United States Patent
Marcelais et al.

(10) Patent No.: US 8,543,543 B2
(45) Date of Patent: Sep. 24, 2013

(54) HASH-BASED FILE COMPARISON

(75) Inventors: Michael Ronn Marcelais, Redmond, WA (US); Shawn Thomas Sullivan, Seattle, WA (US); James Coryell Hilke, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 27 days.

(21) Appl. No.: 13/231,954

(22) Filed: Sep. 13, 2011

(65) Prior Publication Data
US 2013/0066901 A1 Mar. 14, 2013

(51) Int. Cl.
*G06F 17/30* (2006.01)

(52) U.S. Cl.
USPC ........... 707/634; 707/622; 707/698; 707/609; 707/747; 707/821; 717/168; 717/116; 717/170; 717/173

(58) Field of Classification Search
USPC ................. 707/622, 634, 698, 609, 747, 821; 717/168, 116, 170, 173, 216
See application file for complete search history.

(56) References Cited

U.S. PATENT DOCUMENTS

| | | | | | |
|---|---|---|---|---|---|
| 5,412,756 | A | * | 5/1995 | Bauman et al. | 706/45 |
| 5,701,427 | A | * | 12/1997 | Lathrop | 709/237 |
| 5,737,601 | A | * | 4/1998 | Jain et al. | 707/622 |
| 5,806,075 | A | * | 9/1998 | Jain et al. | 1/1 |
| 6,081,665 | A | * | 6/2000 | Nilsen et al. | 717/116 |
| 6,205,551 | B1 | * | 3/2001 | Grosse | 726/25 |
| 6,269,456 | B1 | * | 7/2001 | Hodges et al. | 714/38.1 |
| 6,324,637 | B1 | * | 11/2001 | Hamilton | 711/216 |
| 6,493,871 | B1 | * | 12/2002 | Welch et al. | 717/173 |
| 6,629,138 | B1 | * | 9/2003 | Lambert et al. | 709/224 |
| 6,681,342 | B2 | * | 1/2004 | Johnson et al. | 714/30 |
| 6,694,434 | B1 | * | 2/2004 | McGee et al. | 713/189 |
| 6,754,664 | B1 | * | 6/2004 | Bush | 1/1 |
| 6,839,680 | B1 | * | 1/2005 | Liu et al. | 705/7.33 |
| 6,892,317 | B1 | * | 5/2005 | Sampath et al. | 714/4.3 |
| 7,013,469 | B2 | * | 3/2006 | Smith et al. | 719/328 |
| 7,017,162 | B2 | * | 3/2006 | Smith et al. | 719/328 |
| 7,058,014 | B2 | | 6/2006 | Sim | |
| 7,130,921 | B2 | * | 10/2006 | Goodman et al. | 709/244 |
| 7,185,013 | B2 | * | 2/2007 | Burnett | 1/1 |
| 7,287,068 | B1 | * | 10/2007 | Eriksson et al. | 709/221 |
| 7,313,791 | B1 | * | 12/2007 | Chen et al. | 717/170 |

(Continued)

OTHER PUBLICATIONS

Sadowski, et al., "SimHash: Hash-based Similarity Detection", Retrieved at <<http://simhash.googlecode.com/svn/trunk/paper/SimHashWithBib.pdf>>, Dec. 13, 2007, pp. 1-10.

(Continued)

*Primary Examiner* — Frantz Coby
(74) *Attorney, Agent, or Firm* — Hope Baldauff, LLC

(57) ABSTRACT

Concepts and technologies are described herein for hash-based file comparison. In accordance with the concepts and technologies disclosed herein, a comparison tool is configured to compare hash values in a first hash list associated with a first file to hash values in a second hash list corresponding to a second file. The hash values are computed for functional blocks of the respective files and therefore can be compared to indicate if the functional blocks of the two files match one another. If the hash values match, the functional blocks associated with the respective hash values can be determined to match, while hash values that do not match can indicate that the corresponding functional blocks do not match one another.

18 Claims, 5 Drawing Sheets

(56) References Cited

U.S. PATENT DOCUMENTS

| | | | |
|---|---|---|---|
| 7,555,757 B2* | 6/2009 | Smith et al. | 719/328 |
| 7,716,660 B2* | 5/2010 | Mackay | 717/173 |
| 7,747,480 B1* | 6/2010 | Agresta et al. | 705/28 |
| 7,757,270 B2* | 7/2010 | Blumenau | 726/1 |
| 7,774,456 B1* | 8/2010 | Lownsbrough et al. | 709/224 |
| 7,792,757 B2* | 9/2010 | Blumenau | 705/57 |
| 7,827,349 B1* | 11/2010 | Fair | 711/112 |
| 7,849,328 B2* | 12/2010 | Blumenau | 713/189 |
| 7,917,647 B2* | 3/2011 | Cooper et al. | 709/233 |
| 7,958,087 B2* | 6/2011 | Blumenau | 707/610 |
| 7,958,148 B2* | 6/2011 | Barnes et al. | 707/783 |
| 8,037,036 B2* | 10/2011 | Blumenau et al. | 707/694 |
| 8,083,422 B1* | 12/2011 | Simmons et al. | 400/62 |
| 8,086,578 B2* | 12/2011 | Gosnell | 707/698 |
| 8,271,462 B2* | 9/2012 | Wang et al. | 707/698 |
| 8,272,060 B2* | 9/2012 | Milliken et al. | 726/24 |
| 8,281,298 B2* | 10/2012 | Bielski | 717/168 |
| 8,332,357 B1* | 12/2012 | Chung | 707/634 |
| 2002/0049760 A1* | 4/2002 | Scott et al. | 707/10 |
| 2002/0116151 A1* | 8/2002 | Brown et al. | 702/186 |
| 2003/0028585 A1* | 2/2003 | Yeager et al. | 709/201 |
| 2003/0115251 A1* | 6/2003 | Fredrickson et al. | 709/201 |
| 2003/0233455 A1* | 12/2003 | Leber et al. | 709/226 |
| 2004/0068662 A1* | 4/2004 | Ho et al. | 713/200 |
| 2004/0088564 A1* | 5/2004 | Norman | 713/200 |
| 2004/0205419 A1* | 10/2004 | Liang et al. | 714/57 |
| 2010/0274755 A1 | 10/2010 | Stewart | |
| 2010/0293142 A1 | 11/2010 | Ackerman et al. | |

OTHER PUBLICATIONS

Forman, et al., "Finding Similar Files in Large Document Repositories", Retrieved at <<http://citeseerx.ist.psu.edu/viewdoc/download-?doi=10.1.1.84.5107&rep=rep1&type=pdf>>, Proceedings of the eleventh ACM SIGKDD International Conference on Knowledge Discovery in Data Mining, Aug. 21-24, 2005, pp. 8.

Wicherski, Georg., "peHash: A Novel Approach to Fast Malware Clustering", Retrieved at <<http://www.usenix.org/event/leet09/tech/full_papers/wicherski/wicherski.pdf>>, Proceedings of the 2nd USENIX conference on Large-scale exploits and emergent threats: botnets, spyware, worms, and more, Dec. 7, 2008, pp. 8.

"HashCalc", Retrieved at <<http://www.software-dungeon.co.uk/software.php?id=3069>>, Retrieved Date: May 13, 2011, pp. 2.

* cited by examiner

HASH-BASED FILE COMPARISON

BACKGROUND

Software can be updated for various reasons. For example, software developers may create a new version of software as an upgrade, as a new software release, as a software patch released to address performance or security issues in the software, and for other reasons. When developers modify software or create new releases or patches, some functionality of the software may be modified. Some functionality of the software, however, may remain unchanged from a previous version.

Changes to the functionality of software may be tracked by developers or authors during the modification process. If multiple developers or authors collaborate on the modification process, compiling the various changes and determining what changes have been made can be a difficult and/or time consuming process. Also, some functionality of the software may be inadvertently changed during the modification process.

Because of these and other issues, modified software packages are sometimes distributed in installation packages or upgrades that replace certain files or uninstall a previous version and install the new version of the software in its entirety. Distributing large installation packages and/or patches can consume network resources, storage space, and/or time consumed during transmission of the installation packages or patches.

While some approaches exist for identifying changes made to software during a modification process by identifying simple differences in the software and including only portions that include changed code in the installation packages or patches, some changes made to software code such as time stamps, author fields, and the like, may not affect the functionality of the software. As such, some changes made to software during a modification process may or may not be important for distribution to users.

It is with respect to these and other considerations that the disclosure made herein is presented.

SUMMARY

Concepts and technologies are described herein for hash-based file comparison. In accordance with the concepts and technologies disclosed herein, a hash list can be generated for a first file. In some embodiments, the first file corresponds to a first build of software. The hash list includes hash values for each functional block of the software code. If a second file such as a second build of the software is created or received, the second file can be compared to the first file using a hash-based comparison. In particular, a hash list including hash values for each functional block of the second file can be generated and compared to the hash list for the first file.

As used herein, a "block" is a portion of one or more of the files compared during the hash-based comparison. The blocks can have any size and may or may not be uniform in size relative to other blocks. The files can be separated into functional and non-functional blocks that correspond to particular functionality or information. Thus, the size of the blocks can be, but are not necessarily, determined based upon identified logical divisions in the code of the files. The sizes of the blocks also can be defined by user or program settings, based upon capabilities of a hash algorithm, based upon software or hardware limitations, and/or based upon other considerations. As such, the term "block" as used herein and in the claims is not to be construed as a set length of bits or bytes.

Furthermore, it should be understood that some software files can have millions of "blocks" that may or may not be modified between versions.

In some implementations, a comparison tool is configured to generate the hash lists or to obtain the hash lists from other entities. The comparison tool also can be configured to compare each hash value in the hash lists. The hash values of the two files are selected in a manner such that two compared hash values correspond to the same functional block of code in the two files, for example, two builds or versions of a software package. The comparison tool is configured to compare the hash values and determine if the hash values match and/or are identical. If the hash values are identical, the comparison tool can determine that the functional blocks associated with the respective hash values have been unchanged and/or are the same in both versions or builds of the software.

If the hash values are not identical, the comparison tool can determine that the corresponding functional blocks have been changed between the respective software builds. Data indicating the changed functional blocks of software can be stored by the comparison tool and used by the comparison tool or other entities for various purposes. In some embodiments, the data is used to determine what blocks of the software are to be included in an installation package or patch that is to be distributed to customers. As such, embodiments of the concepts and technologies disclosed herein enable conservation of network, time, and storage resources when distributing new versions, updates, upgrades, or patches for software.

According to one aspect, a comparison tool obtains a first hash list and a second hash list. Each of the hash lists has a number of hash values. The hash values are obtained by hashing functional blocks of the files. The comparison tool compares the hash values of the respective files to determine if the functional blocks of the software are the same and/or if the functional blocks are not the same. Because hash values are used instead of comparing actual software code, the comparison tool can complete the comparison quickly and efficiently with minimal impact to network and other resources.

According to another aspect, the comparison tool obtains a first file and a second file. The comparison tool is configured to recognize a file type associated with the first file and the second file. Because the files are often related to one another, for example as versions of the same software package, the file type can be the same for both files. The comparison tool searches a rule set library to determine if a rule set for the determined file type is available. If so, the comparison tool retrieves the rule set. If not, the comparison tool can use a default rule set.

The rule sets can define what blocks, strings, headers, and the like, are or are not functional for the identified file type. The default rule set can indicate, for example, that all blocks of the files are to be considered functional for the comparison. The comparison tool analyzes each block of the files. If the block is functional, the comparison tool hashes the block and stores the hash in a hash list associated with the file. This process can be repeated until the functional blocks of both files are hashed. After the hash lists are generated, or obtained, the comparison tool can complete the hash-based file comparison.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
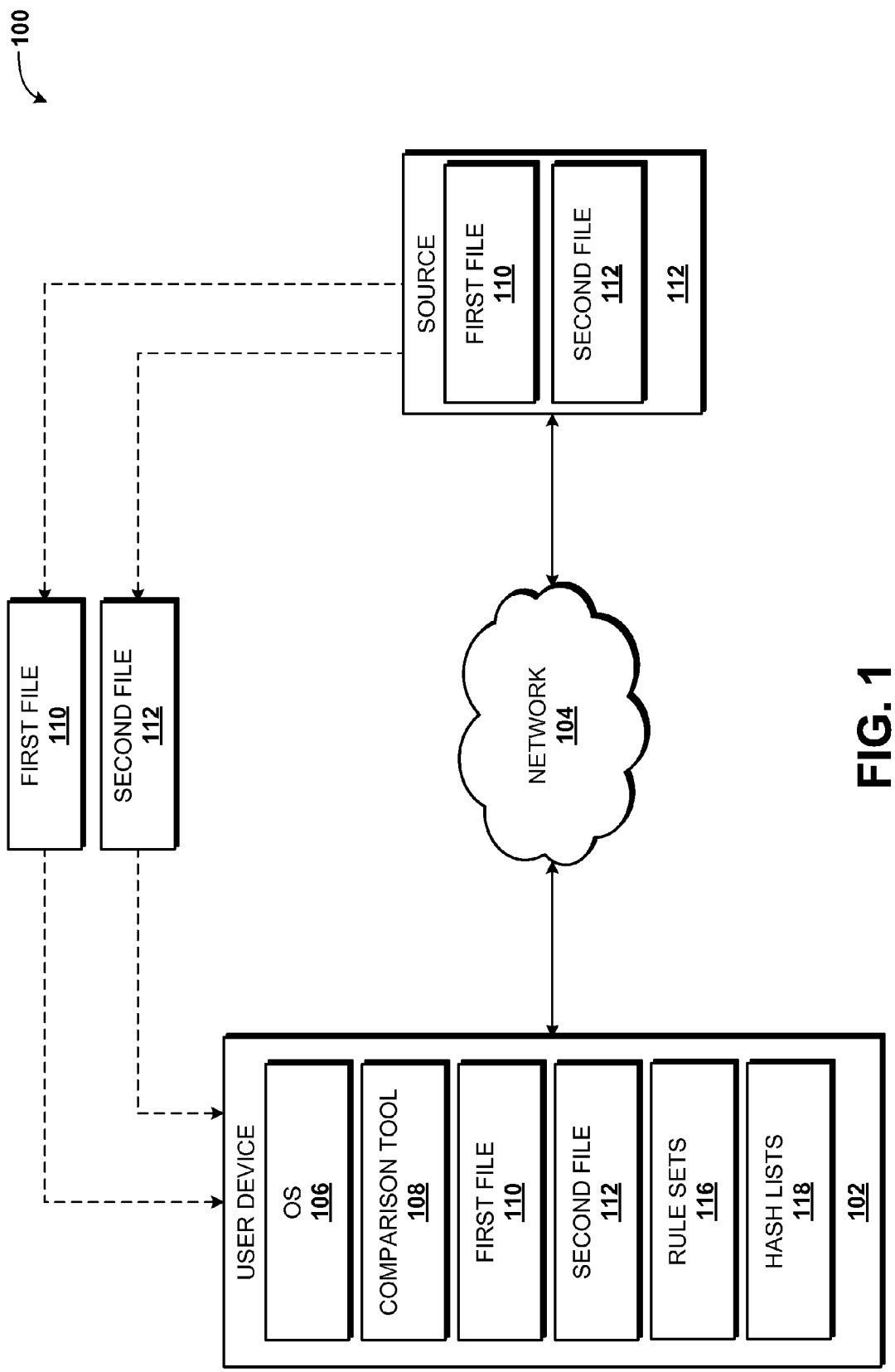
FIG. 1 is a system diagram illustrating an exemplary operating environment for the various embodiments disclosed herein.

The following detailed description is directed to concepts and technologies for hash-based file comparison. According to the concepts and technologies described herein, a first hash list associated with a first file is obtained or generated. The first file can correspond, according to various implementations, to a first build or version of software. The first hash list includes a hash value for each functional block of the first file. A second hash list can be generated or obtained from a previously generated source. The second hash list includes hash values for each functional block of the second file. A comparison tool is configured to generate the hash lists and/or to obtain the hash lists from other entities, and to compare the hash lists to determine if various functional blocks of the files function in the same manner.

In some embodiments, the comparison tool compares corresponding hash values in the respective hash lists to complete a hash-based file comparison, in some embodiments, the comparison tool determines, by way of the hash-based file comparison, if functional blocks corresponding to the compared hash values have been modified or have changed during modification of a first version or build of software to obtain a second version or build. In some embodiments, the comparison tool determines if the hash values match by determining if the hash values are identical. If the hash values match or are identical, the comparison tool can determine that the functional blocks associated with the respective hash values have been unchanged from the previous build to the new build, if the hash values do not match or are not identical, the comparison tool can determine that the corresponding functional blocks have been changed between the respective software builds.

Data indicating the changed functional blocks of software can be stored by the comparison tool and used by the comparison tool or other entities for various purposes. In some embodiments, the data is used to indicate what blocks are to be included in an installation package or patch for distribution to customers. In other embodiments, the data can be used to determine if a new version of a file is to be created or saved. Other uses of the data are described herein.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for hash-based file comparison will be presented.

Referring now to FIG. 1, aspects of one operating environment 100 for the various embodiments presented herein will be described. The operating environment 100 shown in FIG. 1 includes a user device 102. In some embodiments, the user device 102 operates on or in communication with a communications network ("network") 104, though this is not necessarily the case. According to various embodiments, the functionality of the user device 102 is provided by a personal computer ("PC") such as a desktop, tablet, or laptop computer system. In other embodiments, the functionality of the user device 102 is provided by other types of computing systems including, but not limited to, server computers, handheld computers, netbook computers, embedded computer systems, personal digital assistants, mobile telephones, smart phones, or other computing devices. Thus, while the functionality of the user device 102 is described herein as being provided by a PC, it should be understood that this embodiment is illustrative, and should not be construed as being limiting in any way.

According to various embodiments, the user device 102 is configured to execute an operating system 106 and one or more application programs such as, for example, a comparison tool 108 and/or other application programs. The operating system 106 is a computer program for controlling the operation of the user device 102. The comparison tool 108 is an executable program configured to execute on top of the operating system 106 to provide the functionality described herein for performing a hash-based file comparison. For purposes of illustrating and describing the concepts and technologies disclosed herein, the various embodiments described herein use an example wherein the comparison tool 108 performs a hash-based file comparison of a first file 110 and a second file 112. In some embodiments, the first file 110 corresponds to a first version or build of software and the second file 112 corresponds to a second version or build of the software. Because the functionality of the comparison tool 108 can be provided with respect to any types of files, it should be understood that these embodiments are illustrative, and should not be construed as being limiting, in any way.

The comparison tool 108 is configured to receive or store the first file 110 and/or the second file 112. In some embodiments, the first file 110 and/or the second file 112 are stored at the user device 102 in a memory or other suitable data storage component of, associated with, and/or in communication with the user device 102. In other embodiments, the first file 110 and/or the second file 112 can be created or authored at the user device 102 by a user such as, for example, a developer. In yet other embodiments, the first file 110 and/or the second file 112 are obtained from a source 114 that is operating on or in communication with the network 104. The source 114 can be a network hard drive, a server computer operating on the network 104 or in communication therewith, a developer website or device, and/or any other suitable device or entity. Because the first file 110 and/or the second file 112 can be obtained from a variety of sources and/or can be created at a variety of devices or systems, it should be understood that the illustrated embodiment is illustrative, and should not be construed as being limiting in any way.

According to various embodiments of the concepts and technologies disclosed herein, the comparison tool 108 is configured to analyze the first file 110 and/or the second file 112 to identify a file type associated with the files. Because the files can correspond, in some embodiments, to two or more version of a related file, the file type determined with respect to one of the files can correspond to a file type of the other file or files. The comparison tool 108 is configured to search a library or list of rule sets 116 that can be stored at the user device 102 and/or at a data storage device accessible by the user device 102 to determine if a rule set 116 for the determine file type is available to the comparison tool 108. The rule sets 116 are used by the comparison tool 108 to identify functional and/or non-functional blocks of the files analyzed by the comparison tool 108. For example, the rules sets 116 can identify particular strings, headers, or other blocks of code within the files that are known to be functional blocks and/or non-functional blocks.

As noted above, a block can include a portion of one or more of the files 110, 112. The comparison tool 108 can be configured to apply the rule sets 116 to separate files into functional and non-functional blocks that correspond to particular functionality or information. Thus, the size of the blocks can be, but are not necessarily, determined by the comparison tool 108 based upon identified logical divisions in the code of the files 110, 112. In some embodiments, for example, the comparison tool 108 is configured to identify a rule set 116 associated with the file type determined for the files, and to use the rule sets 116 when hashing the file blocks.

The comparison tool 108 can be configured to create hash lists 118 associated with the files. In some embodiments, for example, the comparison tool 108 generates a first hash list 118 associated with the first file 110 and second hash list 118 associated with the second file 112. The comparison tool 108 can generate the hash lists 118 by identifying the functional blocks of the files 110, 112 via application of the determined rule set 116, by generating a hash of each of the identified functional blocks, and adding the hashes of the functional blocks to the hash lists 118. One illustrative embodiment of a method for generating the hash lists 118 is set forth below in more detail with reference to FIG. 3.

The comparison tool 108 also is configured to compare the hash lists 118 to identify differences between compared files 110, 112. According to various implementations, the comparison tool 108 obtains the two or more hash lists 118, selects corresponding hashes from the hash lists 118, and determines if the hashes selected from the respective hash lists 118 match. The comparison tool 108 can store data identifying differences between hashes of the hash lists 118, if any are identified by the comparison tool 108. If hashes of the hash lists 118 do not match, the comparison tool 108 can determine that functional blocks corresponding to the non-matching hashes have been modified with respect to one another, for example, during modification of a first version of software to obtain a second version of the software. As such, the comparison tool 108 is configured, in some embodiments, to identify functional blocks of files that have been changed without directly analyzing the code of the files. Therefore, some embodiments of the concepts and technologies disclosed herein allow for two or more files to be compared using hashes and/or without transmitting, analyzing, storing, or distributing actual computer code associated with the files. It should be understood that these embodiments are illustrative, and should not be construed as being limiting in any way.

While FIG. 1 illustrates a first file 110 and a second file 112 stored at a source 114, it should be understood that the source 114 can be omitted. Furthermore, in some embodiments the source 114 can be configured to store hashes or hash lists 118 corresponding to the first file 110 and/or the second file 112. As such, the hash lists 118 can be obtained front the source 114 and/or can be generated or stored at the user device 102. Therefore, the illustrated embodiment should be understood as being illustrative of one contemplated embodiment, and should not be construed as being limited in any way.

FIG. 1 illustrates one user device 102, one network 104, and one source 114. It should be understood, however, that some implementations of the operating environment 100 include multiple user devices 102, multiple networks 104, and zero or multiple sources 114. Thus, the illustrated embodiments should be understood as being illustrative, and should not be construed as being limiting in any way.

Figure 2:
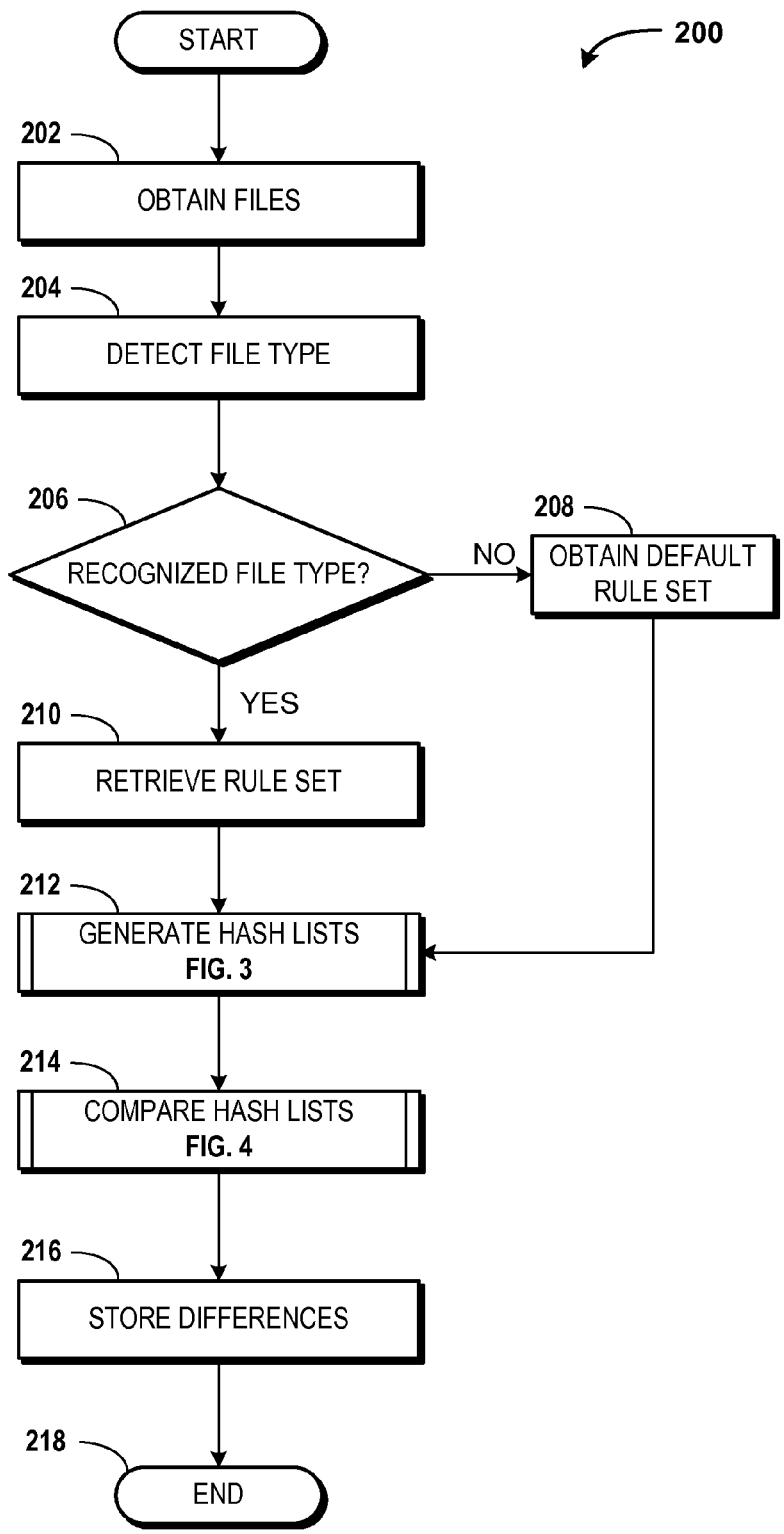
FIG. 2 is a flow diagram showing aspects of a method for hash-based file comparison, according to an illustrative embodiment.

Turning now to FIG. 2, aspects of a method 200 for performing a hash-based file comparison will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the user device 102 via execution of the comparison tool 108. It should be understood that these embodiments are illustrative, and should not be viewed as being limiting in any way. In particular, it should be understood that any suitable device can be configured to provide the functionality disclosed herein via execution of any suitable program or module.

The method 200 begins at operation 202, wherein the comparison tool 108 obtains two files, or two versions of a file. For purposes of describing the various embodiments of the concepts and technologies disclosed herein, the files obtained by the comparison tool 108 in operation 202 are described herein as corresponding to the first file 110 and the second file 112. Because the files obtained in operation 202 can correspond to any files for which the hash-based file comparison described herein is desired, it should be understood that this embodiment is illustrative, and should not be construed as being limiting in any way.

Furthermore, as mentioned above with reference to FIG. 1, in some embodiments of the concepts and technologies disclosed herein, the comparison tool 108 obtains one or more hash lists 118 instead of, or in addition to, obtaining one or more of the files 110, 112. For example, the comparison tool 108 can obtain a hash list 118 corresponding to the first file 110 or the second file 112, and can execute the operations described herein for obtaining a hash list 118 corresponding to the first file 110 or the second file 112. As such, the files obtained in operation 202 can correspond to one or more hash lists 118. Thus, while the illustrated embodiment of the method 200 describes obtaining the files 110, 112 and generating hash lists 118 for the files 110, 112, it should be understood that this embodiment is illustrative, and should not be construed as being limiting in any way.

From operation 202, the method 200 proceeds to operation 204, wherein the comparison tool 108 detects a file type of the files 110, 112 obtained in operation 202. Because the files 110, 112 can correspond, in various embodiments, to two versions or builds of the same software, the file type determined with respect to one of the files 110, 112 can be the same for the other of the files 110, 112, though this is not necessarily the case.

From operation 204, the method 200 proceeds to operation 206, wherein the comparison tool 108 determines if the file type detected in operation 204 corresponds to a recognized file type. As explained above with reference to FIG. 1, the user device 102 can be configured to store or access a library or list of rule sets 116. Thus, the comparison tool 108 can analyze the files 110, 112 obtained in operation 202 and can determine if a rule set 116 is stored for a file type corresponding to the files 110, 112. In other embodiments, the comparison tool 108 is configured to determine that the file type is recognized in other ways such as analyzing headers, examining file extensions, and/or in other ways. As such, the illustrated example of comparing the file types to stored rule sets 116 should be understood as being illustrative.

If the comparison tool 108 determines in operation 206 that the file type detected in operation 204 is not a recognized file type and/or if a rule set 116 associated with the determined file type is not available, the method 200 proceeds to operation 208. In operation 208, the comparison tool 108 can obtain a default rule set 116. In some embodiments, the rule set 116 is used by the comparison tool 108 to determine what blocks of the files 110, 112 are functional and/or what blocks of the files are non-functional. In one implementation, the default rule set 116 obtained in operation 208 can indicate that all blocks of the files 110, 112 are functional. As such, the default rule set 116 can be used to ensure that no functional blocks are omitted during generation of the hash lists 118. The rule sets 116, and the application thereof, are discussed in more detail herein, and generation of the hash lists 118 will be described below with reference to FIG. 3.

If the comparison tool 108 determines in operation 206 that the file type detected in operation 202 corresponds to a recognized file type or that a rule set 116 associated with the determined file type is available, the method 200 proceeds to operation 210. In operation 210, the comparison tool 108 obtains a rule set 116 for the detected file type. As explained above, the comparison tool 108 can obtain the rule sets 116 from a local storage device, from a remote storage device, and/or any other suitable data storage location.

From operation 210, the method 200 proceeds to operation 212, wherein the comparison tool 108 generates the hash lists 118. More particularly, the comparison tool 108 can generate a hash list 118 for each of the files 110, 112 obtained in operation 202. An illustrative method for generating the hash lists 118 is illustrated and described below with reference to FIG. 3.

As mentioned above, in some embodiments of the concepts and technologies disclosed herein, the comparison tool 108 obtains one or more hash lists 118 at operation 202 instead of, or in addition to, the files 110, 112. As such, in some embodiments, the operations described herein with reference to operation 212 and/or FIG. 3 can be omitted and the method 200 can proceed from operation 210 to operation 214. As such, the illustrated embodiment should be understood as being illustrative and should not be construed as being limited in any way.

From operation 212, the method 200 proceeds to operation 214, wherein the comparison tool 108 compares the hash lists 118 generated in operation 212 and/or obtained in operation 202. More particularly, the comparison tool 108 can compare each hash of the hash lists 118 to one another to determine if any functional changes have been made to files associated with the hash lists 118, for example the files 110, 112 obtained in operation 202. An illustrative method for comparing the hash lists 118 is illustrated and described below in additional detail with reference to FIG. 4.

From operation 214, the method 200 proceeds to operation 216, wherein the comparison tool 108 stores differences determined to exist between the compared hash lists 118. As explained above, differences noted between the hash lists 118 can correspond to functional differences between the files 110, 112 obtained in operation 202 or associated with the hash lists 118 if the hash lists 118 are received in operation 202. Data indicating the functional differences in the files 110, 112 corresponding to the hash lists 118 can be stored in a data storage device and/or can be used for various purposes. From operation 216, the method 200 proceeds to operation 218. The method 200 ends at operation 218.

In one implementation the comparison tool 108 uses the hash-based file comparison to identify functional changes made to a program or software package by comparing the hash lists 118 to one another. This data can be used when preparing installation packages, upgrade packages, software patches, and/or other software. As such, some embodiments of the concepts and technologies disclosed herein enable the user device 102 or other entities to reduce the size of patches, installation packages, upgrade packages, and the like, by including only blocks of software that have been functionally changed since a previous patch or release. As such, bandwidth, storage resources, download times, distribution times, installation times, and/or other resources used for distributing the installation packages, upgrade packages, software patches, and the like can be reduced relative to other methods of distributing software that may rely upon distributing entire software packages or installation packages for entire software packages.

In another embodiment, the differences between files compared to one another using the hash-based file comparison described herein are used to provide publication of private software releases. In particular, testers or other entities may be enabled to test private releases of a build by receiving data indicating functional changes made to the software. Thus, the testers can access new versions of software without obtaining the full new version, instead relying upon the data that indicates functional changes in the new version. It should be understood that this embodiment is illustrative, and should not be construed as being limiting in any way.

In yet another embodiment, the data can be used to provide single instance storage of files. For example, if a file is opened and modified without any functional changes being made, creation and/or storage of a new version may or may not be important. As such, embodiments of the concepts and technologies disclosed herein can be embodied in a storage device for determining if an existing version of software has been functionally modified and/or if the modifications are to be saved as a new version. This determination can be based upon user settings, options, and/or other considerations. In some embodiments, the storage device can be configured to notify a user if functional modifications have been made if a user attempts to save a new version of a file. It should be understood that this embodiment is illustrative, and should not be construed as being limiting in any way.

In still other embodiments, the comparison tool 108 uses the hash-based file comparison to compare any type of data. Thus, the hash-based file comparison disclosed herein can be used to compare any types of files and not only programs or software. For example, the comparison tool 108 can be configured to compare portions of files such as, for example, meaningful parts of image files to identify sections of the image that have changed with respect to one another. In one contemplated example, two or more images of regions of the night sky can be compared by the comparison tool 108 to track movement of stellar objects and/or to identify new objects such as asteroids, comets, and the like based upon changes between two or more images. Thus, the hash lists 118 can, in the example embodiment, correspond to a rule-set for identifying locations of stellar objects. It should be understood that this embodiment is illustrative, and should construed as being limiting in any way.

Figure 3:
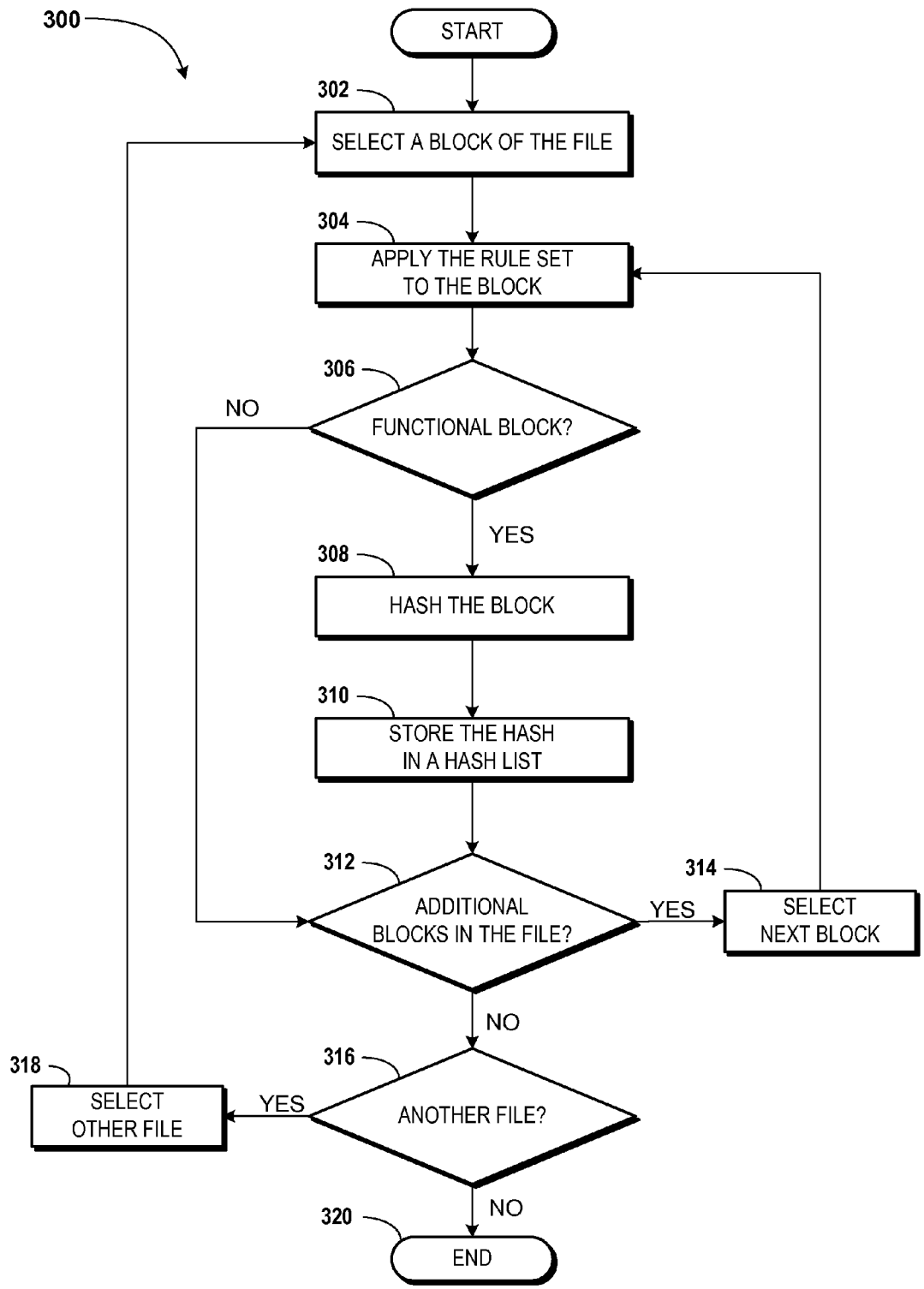
FIG. 3 is a flow diagram showing aspects of a method for generating hash lists, according to an illustrative embodiment.

Turning now to FIG. 3, a method 300 for generating the hash lists 118 will be described, according to an illustrative embodiment. As explained above with reference to FIG. 2, the operations described herein with reference to the method 300 can be provided by the comparison tool 108 during or within execution of operation 212 of the method 200 described above. It should be understood that this embodiment is illustrative, and should not be construed as being limiting in any way.

The method 300 begins at operation 302, wherein the comparison tool 108 selects a block of a file. For example, if the comparison tool 108 compares the first file 110 to the second file 112, operation 302 can include selecting a block of the first file 110 or the second file 112. The files 110, 112 obtained in operation 202 of the method 200 can have any number of blocks, and any number of the blocks of the file can be functional blocks and/or non-functional blocks. As noted above, a block can be a portion of a file and can have any size. In some embodiments, the comparison tool 108 is configured to separate files into functional and non-functional blocks that correspond to particular functionality or information.

From operation 302, the method 300 proceeds to operation 304, wherein the comparison tool 108 applies the rule set 116 to the selected block and determines, in operation 306, if the block is functional or non-functional. As explained above, the rule set 116 can identify functional and/or non-functional blocks of files based upon file types and/or other considerations. A time stamp, for example, can be modified if a program is modified, though such a modification may be defined by the rule sets 116 as being, or not being, a functional change to the software. As such, a time stamp modification may, or may not, be considered a functional change that is to be captured in an update or installation package.

If the comparison tool 108 determines, in operation 306, that the selected block corresponds to a functional block, the method 300 can proceed to operation 308. At operation 308, the comparison tool 108 hashes the selected block. The comparison tool 108 can apply any desired hashing algorithm or process in operation 308. In some embodiments, the blocks are hashed to produce a two-hundred-fifty-six bit hash. It should be understood that this embodiment is illustrative, and should not be construed as being limiting in any way.

In some embodiments, the comparison tool 108 also is configured to determine if the selected block, if functional, has any non-functional information that may, or may not, result in different hash values among the two files 110, 112 even if functional changes have not been made to the block. For example, a date value in a functional block may be changed if a new version of software is changed, though the date change may not be a functional change. As such, the comparison tool 108 is configured, in some embodiments, to substitute zero values for such non-functional information within functional blocks during hashing of the functional blocks. Some embodiments of the comparison tool 108 can therefore help avoid generation of different hash values based upon non-functional differences.

In other embodiments, some portions of a functional block may be non-functional, but may be of non-uniform size relative to a same non-functional portion of the same functional block of another version of the file. For example, an author name field may be of non-uniform lengths across different versions of software. As such, zeroing this field may produce non-uniform hash values, even if no functional changes have been made to the respective blocks. As such, some embodiments of the concepts and technologies disclosed herein provide for skipping such fields or portions of functional blocks during the hashing of the functional blocks.

From operation 308, the method 300 proceeds to operation 310, wherein the comparison tool 108 stores the hash generated in operation 308 in a hash list 118. From operation 310, or if the comparison tool 108 determines in operation 306 that the selected block is non-functional, the method 300 proceeds to operation 312. At operation 312, the comparison tool 108 determines if the file being analyzed has additional blocks.

If the comparison tool 108 determines in operation 312 that the analyzed file has additional blocks, the method 300 proceeds to operation 314. At operation 314, the comparison tool 108 selects a next block of the file and returns to operation 304. The steps of operations 304 through 314 can be iterated by the comparison tool 108 until the comparison tool 108 determines that there are no additional blocks in the file.

If the comparison tool 108 determines, in any iteration of operation 312, that the file has no additional blocks, the method 300 proceeds to operation 316. At operation 316, the comparison tool 108 determines if another file is available for the hash-based file comparison. For example, the comparison tool 108 may generate a hash list 118 for the first file 110 and may determine, in operation 316, that the second file 112 is now to be analyzed. It should be understood that this embodiment is illustrative, and should not be construed as being limiting in any way.

If the comparison tool 108 determines, at operation 316, that another file is to be analyzed, the method 300 proceeds to operation 318. At operation 318, the comparison tool 108 selects the other file. The method 300 returns from operation 318 to operation 302, wherein the comparison tool 108 selects a block of the other file. The comparison tool 108 can iterate operations 302 through 316 until the comparison tool 108 determines, in any iteration of operation 316, that another file does not exist. If the comparison tool 108 determines, in any iteration of operation 316, that another version of the file does not exist, the method 300 proceeds to operation 320. The method 300 ends at operation 320.

Figure 4:
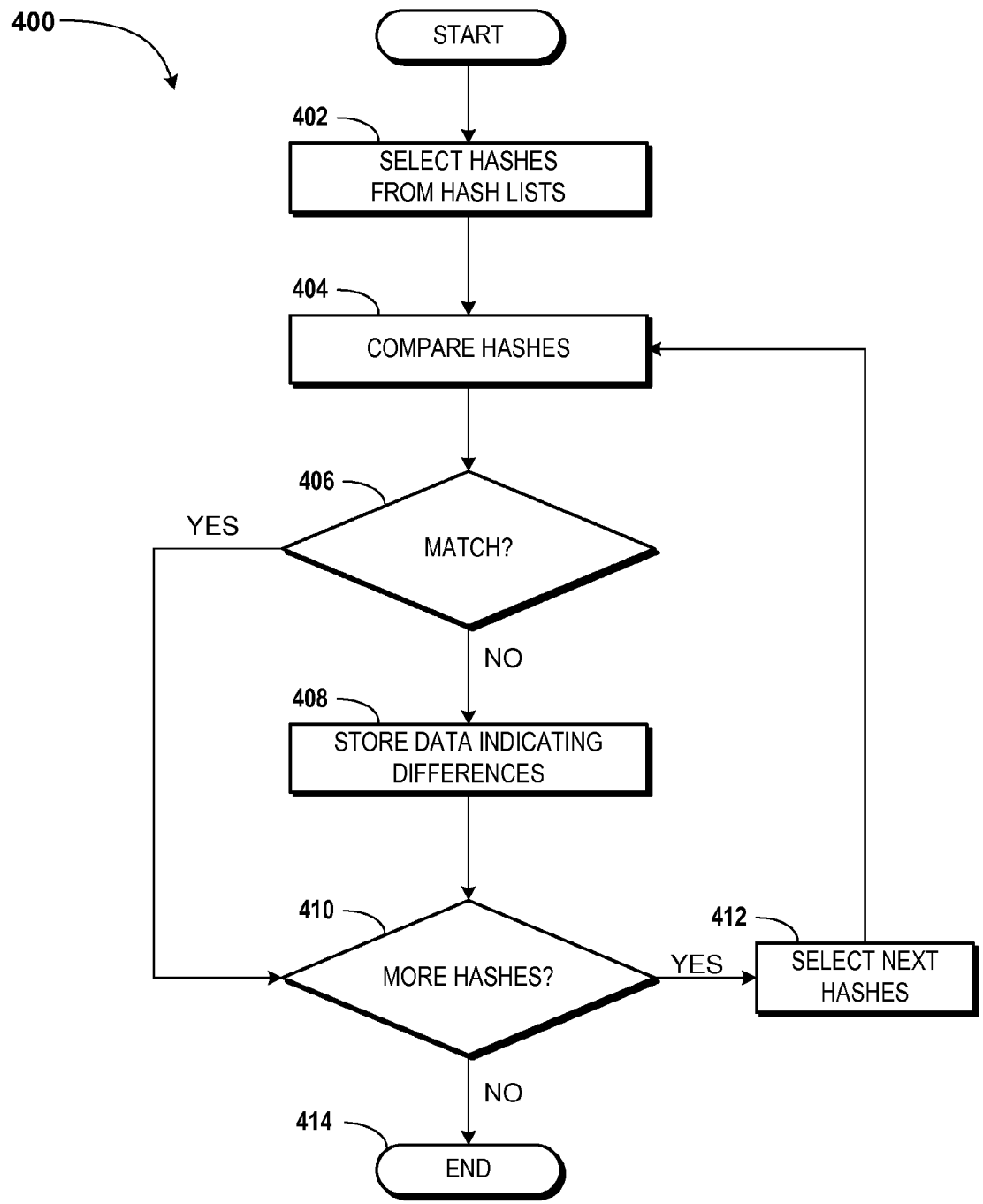
FIG. 4 is a flow diagram showing aspects of a method for comparing hash lists, according to an illustrative embodiment.

Turning now to FIG. 4, a method 400 for comparing hash lists 118 will be described, according to an illustrative embodiment. As explained above with reference to FIG. 2, the operations described herein with reference to the method 400 can be provided by the comparison tool 108 during or within execution of operation 214 of the method 200 described above. It should be understood that this embodiment is illustrative, and should not be construed as being limiting in any way.

The method 400 begins at operation 402, wherein the comparison tool 108 selects hashes from the compared hash lists 118. In particular, the comparison tool 108 can select corresponding hashes from the hash lists 118 to compare to one another. In various embodiments, the hashes selected from the hash lists 118 correspond to one another and to a same functional block of two compared files such as, for example, the first file 110 and the second file 112. The comparison tool 108 can identify corresponding hashes based upon respective locations within the corresponding files, based upon identifiers, and/or via other methods.

From operation 402, the method 400 proceeds to operation 404, wherein the comparison tool 108 compares the selected hashes and determines, at operation 406, if the selected hashes match one another. Because the hashes are, in various embodiments, text or character strings, the comparison of operation 406 can be performed efficiently and quickly. For example, the comparison tool 108 can compare the hashes to determine if the hashes are identical. For example, in some embodiments the hashes are two-hundred-fifty-six bit hash values that can be quickly compared to determine if the hash values are identical. If the hashes are not identical, the comparison tool 108 can determine that the hashes do not match and that the functional blocks corresponding to the compared hashes therefore do not match.

If the comparison tool 108 determines, in operation 406, that the hashes do not match, the method 400 proceeds to operation 408. At operation 408, the comparison tool 108 stores data indicating the difference between the compared hashes and/or the corresponding functional blocks of the files 110, 112. In some embodiments, the differences include a binary yes/no, true/false, 0/1, or other indicator for indicating a match or mismatch. Thus, the data stored in operation 408 can be, but is not necessarily, limited to an indication as to whether or not the compared hashes are identical to one another.

From operation 408, or if the comparison tool 108 determines in operation 406 that the compared hashes match one another, the method 400 proceeds to operation 410. At operation 410, the comparison tool 108 determines if additional hashes exist in the hash lists 118 for comparison. If the comparison tool 108 determines, in operation 410, that additional hashes exist in the hash lists 118, the method 400 proceeds to operation 412.

At operation 412, the comparison tool 108 selects a next hash and the method 400 returns to operation 404 wherein the next hashes are compared. The operations 404-410 can be repeated until the comparison tool 108 determines, in any iteration of operation 410, that additional hashes do not exist in the hash lists 118. If the comparison tool 108 determines, in any iteration of operation 410, that additional hashes do not exist in the hash lists 118, the method 400 proceeds to operation 414. The method 400 ends at operation 414.

While the description above has described using the hash lists 118 for performing a hash-based file comparison, it should be understood that the hash lists 118 can be used for other purposes as well. In particular, some embodiments of the concepts and technologies disclosed herein generate the hash lists 118 from functional portions of files and make use of the hash lists 118 and/or the hashes therein for any purpose. For example, the hashes can be used as unique identifiers to identify the functionality of a particular file, for representing portions of a file, and/or for any other purpose that is or can be associated with hashes. As such, the illustrated embodiments should be understood as being illustrative, and should not be construed as being limited in any way.

Figure 5:
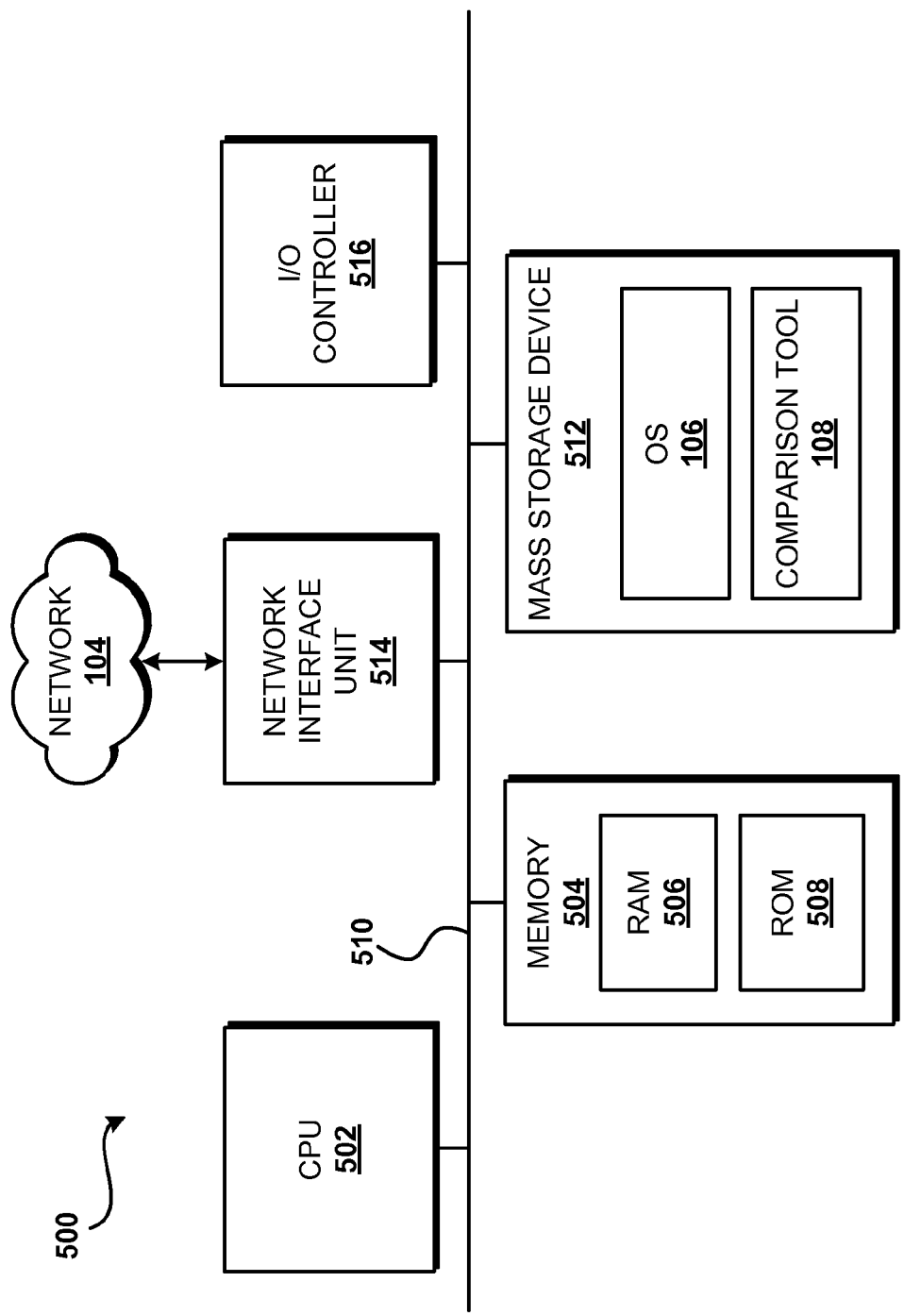
FIG. 5 is a computer architecture diagram depicting an illustrative computer hardware and software architecture for a computing system capable of implementing aspects of the embodiments presented herein.

FIG. 5 illustrates an illustrative computer architecture 500 for a device capable of executing the software components described herein for performing a hash-based file comparison. Thus, the computer architecture 500 illustrated in FIG. 5 illustrates an architecture for a server computer, a mobile phone, a PDA, a smartphone, a desktop computer, a netbook computer, a tablet computer, a laptop computer, and/or other suitable computing devices. The computer architecture 500 may be utilized, to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the RUM 508. The computer architecture 500 further includes a mass storage device 512 for storing the operating system 106 and the comparison tool 108. Although not illustrated in FIG. 5, the mass storage device 512 is configured, in some embodiments, to store the first file 110, the second file 112, the rule sets 116, the hash lists 118, and/or other data.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium" and variations thereof, does not include waves, signals, and/or other transitory and/or intangible communication media, per se.

According to various embodiments, the computer architecture 500 may operate in a networked environment using logical connections to remote computers through a network such as the network 104. The computer architecture 500 may connect to the network 104 through a network interface unit 514 connected to the bus 510. It should be appreciated that the network interface unit 514 also may be utilized to connect to other types of networks and remote computer systems, for example, the source 114 and/or other entities, if desired. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled, in the art. It is also contemplated that the computer architecture 500 may not include all of the components shown in FIG. 5, may include other components that are not explicitly shown in FIG. 5, or may utilize an architecture completely different than that shown in FIG. 5.

In some embodiments, some, all, or none of the elements of the computer architecture 500 illustrated and described herein are provided by one or more virtual computing resources and/or distributed computing resources. Thus, the computer architecture 500 can correspond to resources operating or executing on a network such as the network 104. In some embodiments, for example, the functionality of the CPU 502 can be provided by a processing resource provided by one or more server computers executing on a network, and the functionality of the system memory 504 can be provided by one or more network storage devices such as, for example, a datastore, a server computer, and/or other devices. As such, it should be understood that virtual computing resources or other distributed computing environments can execute any aspects of the software components disclosed herein.

Based on the foregoing, it should be appreciated that technologies for hash-based file comparison have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for performing a hash-based comparison of a first file and a second file, the computer-implemented method comprising performing computer-implemented operations for:
obtaining a first hash list having hash values corresponding to functional blocks of the first file;
obtaining a second hash list having hash values corresponding to functional blocks of the second file;
comparing, at a comparison tool, a first hash value in the first hash list to a corresponding hash value in the second hash list; and
determining, based upon the comparing, if a functional block of the first file matches a corresponding functional block of the second file, wherein obtaining the first hash list and the second hash list comprises generating the first hash list and the second hash list at the comparison tool by determining a file type associated with at least one of the first file or the second file and retrieving a rule set corresponding to the determined file type.

2. The method of claim 1, wherein comparing the first hash value to the corresponding hash value comprises determining if the first hash value and the corresponding hash value are identical.

3. The method of claim 2, further comprising determining that the functional block of the first file matches the corresponding functional block of the second file in response to determining that the first hash value is identical to the corresponding hash value.

4. The method of claim 2, further comprising in response to determining that the first hash value is not identical to the corresponding hash value
determining that the functional block of the first file does not match the corresponding functional block of the second file, and
storing data indicating that the functional block of the first file does not match the corresponding functional block of the second file.

5. The method of claim 1, wherein obtaining the first hash list and the second hash list comprises:
generating the first hash list at the comparison tool; and
obtaining the second hash list at the comparison tool by retrieving the second hash list from a source configured to store the second hash list.

6. The method of claim 1, wherein generating the first hash list comprises:
selecting a block of code from the first file;
determining, based upon the rule set, if the block of code corresponds to a functional block of code; and
in response to determining that the block of code corresponds to the functional block of code
hashing the block of code to obtain the first hash value, and
storing the first hash value in the first hash list.

7. The method of claim 6, further comprising:
in response to determining that the block of code does not correspond to the functional block of code, determining if the first file comprises a further block of code; and
in response to determining that the first file comprises the further block of code
selecting the further block of code, and
determining if the further block of code corresponds to a further functional block of code.

8. The method of claim 1, wherein obtaining the first hash list and the second hash list comprises generating the first hash list and the second hash list at the comparison tool by:
determining a file type associated with at least one of the first file or the second file; and
in response to determining that a rule set corresponding to the determined file type is not available, obtaining a default rule set.

9. The method of claim 8, wherein the default rule set comprises a rule that each block of the first file and the second file is functional and is to be hashed.

10. A computer-implemented method for performing a hash-based comparison of a first file and a second file, the computer-implemented method comprising performing computer-implemented operations for:
obtaining the first file and the second file;
generating a first hash list having hash values corresponding to functional blocks of the first file by determining a file type associated with the first file, determining if a rule set corresponding to the determined file type is available, retrieving the rule set corresponding to the determined file type in response to determining that the rule set is available, and retrieving a default rule set response to determining that the rule set is not available;
generating a second hash list having hash values corresponding to corresponding functional blocks of the second file;
comparing, at a comparison tool, a first hash value in the first hash list to a corresponding hash value in the second hash list; and
determining, based upon the comparing, if one of the functional blocks of the first file matches a corresponding one of the functional blocks of the second file.

11. The method of claim 10, wherein comparing the first hash value to the corresponding hash value comprises determining if the first hash value and the corresponding hash value are identical, and further comprising determining that the functional block of the first file matches the corresponding functional block of the second file in response to determining that the first hash value is identical to the corresponding hash value.

12. The method of claim 10, wherein generating the first hash list comprises:
selecting a block of code from the first file;
determining, based upon the rule set, if the block of code corresponds to a functional block of code; and
in response to determining that the block of code corresponds to the functional block of code
hashing the block of code to obtain the first hash value, and
storing the first hash value in the first hash list.

13. The method of claim 10, further comprising:
in response to determining that the block of code does not correspond to the functional block of code, determining if the first file comprises a further block of code; and
in response to determining that the first file comprises the further block of code
selecting the further block of code, and
determining if the further block of code corresponds to a further functional block of code.

14. The method of claim 10, wherein generating the first hash list comprises selecting a block of code from the first file, and in response to determining that the default rule set is used, hashing the block of code to obtain the first hash value and storing the first hash value in the first hash list.

15. A computer storage medium having computer readable instructions stored thereupon that, when executed by a computer, cause the computer to:
obtain a first file and a second file at a comparison tool;

determine, at the comparison tool, a file type associated with at least one of the first file or the second file;

retrieve a rule set corresponding to the determined file type;

generate, based at least partially upon the rule set, at least one of a first hash list or a second hash list, the first hash list having hash values corresponding to functional blocks of the first file and the second hash list having hash values corresponding to corresponding functional blocks of the second file;

compare, at a comparison tool, a first hash value in the first hash list to a corresponding hash value in the second hash list to determine if the first hash value matches the corresponding hash value;

in response to determining that the first hash value matches the corresponding hash value, determine that one of the functional blocks of the first file matches a corresponding one of the functional blocks of the second file; and in response to determining that the first hash value does not match the corresponding hash value, determine that the one of the functional blocks of the first file does not match the corresponding one of the functional blocks of the second file.

16. The computer storage medium of claim 15, wherein retrieving the rule set comprises determining if the rule set corresponding to the determined file type is available;

retrieving the rule set corresponding to the determined file type, in response to determining that the rule set is available; and retrieving a default rule set in response to determining that the rule set is not available.

17. The computer storage medium of claim 15, wherein generating the at least one of the first hash list or the second hash list comprises generating the second hash list, and wherein generating the second hash list further comprises:

selecting a block of code from the second file;

determining, based upon the rule set, if the block of code corresponds to a functional block of code; and in response to determining that the block of code corresponds to the functional block of code hashing the block of code to obtain the corresponding hash value, and storing the corresponding hash value in the second hash list.

18. The computer storage medium of claim 17, further comprising:

in response to determining that the block of code does not correspond to the functional block of code, determining if the second file comprises a further block of code; and in response to determining that the second file comprises the further block of code selecting the further block of code, and determining if the further block of code corresponds to a further functional block of code.

* * * * *